United States Patent
Geaghan

[11] Patent Number: 6,133,906
[45] Date of Patent: Oct. 17, 2000

[54] DISPLAY-INTEGRATED STYLUS DETECTION SYSTEM

[75] Inventor: Bernard O. Geaghan, Andover, Mass.

[73] Assignee: MicroTouch Systems, Inc., Methuen, Mass.

[21] Appl. No.: 08/434,558

[22] Filed: May 4, 1995

Related U.S. Application Data

[63] Continuation of application No. 08/031,614, Mar. 15, 1993, abandoned.

[51] Int. Cl.$^7$ .................................................. G09G 5/00
[52] U.S. Cl. ..................................... 345/179; 178/18.01
[58] Field of Search ...................... 178/18–20; 345/173, 345/174; 341/33, 32

[56] References Cited

U.S. PATENT DOCUMENTS

| | | | |
|---|---|---|---|
| 3,761,877 | 9/1973 | Fernald | 178/18.09 |
| 3,772,685 | 11/1973 | Masi | 341/31 |
| 3,832,693 | 8/1974 | Ishizaki et al. | 345/173 |
| 3,990,070 | 11/1976 | Spence | 341/26 |
| 4,058,849 | 11/1977 | Fitzgerald et al. | 364/52 |
| 4,125,873 | 11/1978 | Chesarek | 345/202 |
| 4,190,833 | 2/1980 | Bejting et al. | 345/80 |
| 4,345,248 | 8/1982 | Togashi et al. | 345/90 |
| 4,363,029 | 12/1982 | Piliavin et al. | D10/39 |
| 4,405,921 | 9/1983 | Mukaiyama | 345/182 |
| 4,525,032 | 6/1985 | Hilsum | 349/12 |
| 4,639,720 | 1/1987 | Rympalski et al. | 340/712 |
| 4,785,564 | 11/1988 | Gurtler | 345/168 |
| 4,839,634 | 6/1989 | More et al. | 178/18.09 |
| 4,841,290 | 6/1989 | Nakano et al. | 345/179 |
| 4,893,115 | 1/1990 | Blanchard | 345/174 |
| 4,917,308 | 4/1990 | Meadows | 239/590 |
| 5,162,782 | 11/1992 | Yoshioka | 345/173 X |
| 5,194,862 | 3/1993 | Edwards | 341/33 X |
| 5,283,556 | 2/1994 | Ise | 345/174 |

FOREIGN PATENT DOCUMENTS

| | | |
|---|---|---|
| 2161935 | 1/1986 | United Kingdom . |
| 2223986 | 7/1988 | United Kingdom . |
| 2250822 | 8/1993 | United Kingdom . |

*Primary Examiner*—Amare Mengistu
*Attorney, Agent, or Firm*—Iandiorio & Teska

[57] ABSTRACT

A system and method of measuring the position of a stylus relative to a computer information display device. The position is used to generate coordinates for the purpose of interacting with the computer. Applications may include pointing to icons on the display, picking menu items, editing of computer generated images, and feedback for input of hand drawn characters and graphics. The system uses the electrodes of the display device as part of the positioning circuit.

4 Claims, 7 Drawing Sheets

DISPLAY-INTEGRATED STYLUS DETECTION SYSTEM

This is a continuation of application Ser. No. 08/031,614, filed Mar. 15, 1993, now abandoned.

FIELD OF INVENTION

This invention relates to a display-integrated stylus detection system that uses the display electrodes as part of the system.

BACKGROUND

The task of locating a stylus with respect to a display device has been solved by a number of methods. CRT monitors have been used with light pens and touch screens for this purpose. Stylus position detection on flat panel displays has been done with touch screen technology and electronic digitizer technology. Some specific implementations are described below.

Light Pens

A light pen senses the change in light from the CRT phosphor as the electron beam passes within the light pen's field of view. The position of the pen relative to the display is calculated by timing the pen's light detection signal versus the known time/position relationship of the CRT scanning system. Light pens have the advantage that they do not require an overlay in front of the display.

Although light pens are useful for CRT monitors, they are not suitable for displays which do not emit light, such as LCD's, or for displays which are not refreshed by a regular, repetitive scanning sequence, such as plasma displays and LCD's. In addition, the accuracy of a light pen is limited and it is dependent on variables such as display brightness and scan timing.

Touch Screen Technology

Touch screen technology has been used to implement the digitizer function in conjunction with displays. Touch screens provide the advantage of transparency, such that they may be used as an overlay in front of a display.

Touch screens use a variety of methods to detect the position of a stylus or a person's finger relative to a display. Methods of implementing touch screens include transparent conductive coatings on glass, arrays of light beams, and surface acoustic waves. The devices using conductive coatings on glass have been applied to writing stylus applications in addition to finger touch. All of these methods require a sensing apparatus which is independent of the display.

W. Pepper, Jr's U.S. Pat. Nos. 4,071,691; 4,129,747; and 4,198,539 describe position sensing devices which have been implemented in practice as touch screens consisting of a transparent resistive surface on a glass substrate. This device is sufficiently transparent that it may be placed in front of a display device. In this application, coordinates derived from the touch screen may be mapped to the coordinates of the display. The Grid Pad product introduced in 1989 by Grid, Inc. uses a resistive sheet overlay device based on W. Pepper, Jr's patents. The Grid device uses a stylus for pointing and hand drawn graphic input.

U.S. Pat. Nos. 4,220,815 and 4,220,815 by W. A. Gibson, et.al describe another touch screen implementation using a conductive coating on glass with a plastic overlay. The methods used in these patents were also applied to a stylus based writing input device in U.S. Pat. No. 3,911,215 by G. S. Hurst and W. C. Colwell, Jr.

All of these devices have the disadvantage that they require an overlay of glass and/or metal films over a display device, which adversely affects display optics. Also, the digitizer function is not inherently aligned with the display device with which it is used. Accordingly, alignment must be accomplished mechanically, or through computation.

Magnetic & Electrostatic Digitizers

Magnetic and electrostatic digitizer technology has been applied to stylus position detection, and these have been used in combination with flat panel displays to locate the stylus relative to a display. Sony introduced the PalmTop PTS-500 product in 1990 for sale in Japan. This uses a separate digitizer overlaid in front of an LCD display to detect the position of a stylus. The digitizer is a magnetic or electrostatic type built on a glass substrate with nearly transparent electrodes.

This has the disadvantage that the digitizer glass and electrodes cause optical interference with the display. Also, the digitizer coordinate system is not inherently aligned with the display.

A display/digitizer configuration has been proposed and tested with an LCD display placed physically in front of an electromagnetic digitizer. In this case, the electromagnetic fields of the digitizer permeate the LCD and its backlighting system to locate the position of a stylus in front of the LCD. This system has the advantage of eliminating the optical interference of a digitizer overlay in front of the display. It also has significant technical and functional disadvantages. For example, the accuracy of an electromagnetic digitizer decreases as the distance between the digitizer surface and the stylus increases. Placement of metals and other conductive objects (e.g. the LCD display) between the stylus and the digitizer surface will decrease accuracy of the digitizer. The large distance between the stylus and the digitizer surface will cause parallax errors in position measurements Also, noise emitted from the display will cause errors in the digitizer system.

Digitizers & Detectors Integrated with a Display

U.S. Pat. No. 4,839,634 by E. S. More and U.S. Pat. No. 4,841,290 by M. Nakano et. al. have advantages over the other prior art described above. In both of these patents, the input device integrates a flat panel display with a digitizer and stylus, eliminating two major disadvantages: the digitizer/display alignment problem and the optical interference from an overlay. Both use a modified flat panel display for this purpose.

The major benefit to the two approaches is that they use the X/Y electrode pattern of the display to perform position sensing as well as data display. A major problem with both approaches is that they alternate use of the electrodes between the display and position-sense functions. Time-sharing of display drive signals in this way will result in several problems:

Contrast and field of view of passive matrix LCD's are dependent on the amount of time available for driving each pixel. Reducing this time by time-sharing with another function will reduce display quality.

The required data rate for text input is about 100 to 200 samples per second. The More patent stresses the need for fast sampling, but the example given is for 30 samples per second. This sample rate is insufficient for the task, and it will be limited by the disclosed display/position signal alternating approach.

Alternating the electrode drive from screen refresh to position sensing necessitates interrupting the physical display drive signals and gating or multiplexing them. This means a display cannot be retrofitted with this technology; it must be built in. The display driver electronics of many displays are physically integrated with the display such that addition of multiplexers is a significant mechanical problem as well. This is specially true of LCD's.

The Nakano patent is also limited to transmitting magnetically from an X/Y matrix display and receiving in a stylus. Neither More nor Nakano addresses the issue of edge effects at the periphery of their electric or magnetic fields.

U.S. Pat. No. 4,363,029 describes a means of detecting a finger touch on an LCD display. The method involves sensing the change in capacitance of an LCD element due to proximity of a person's finger. The change is detected relative to a reference capacitance element in the device. This detects the presence of a finger touch in proximity with a discrete display element only; it does not detect position. This method is suitable for detection of touch on a small LCD display, but it cannot be used to detect position on a large LCD with hundreds or thousands of display elements. Also, this method requires a reference element for each display element which does touch detection.

U.S. Pat. No. 4,893,115 describes an integrated display & touch screen device. This approach has the advantage that it is self-aligning to the display. It has the disadvantage that it needs an overlay in front of the display to shunt the display signals in response to a touch.

SUMMARY OF INVENTION

It is therefore an object of this invention to provide a display-integrated stylus detection system in which the optical qualities of the display are not hindered by the digitization device.

It is a further object of this invention to provide such a system in which the digitized coordinates are inherently aligned with the displayed images.

It is a further object of this invention to provide such a system in which the display electrodes are used as part of the digitizer.

It is a further object of this invention to provide such a system in which the digitizer is integral with the display.

It is a further object of this invention to provide such a system in which optical parallax between the digitizer and the display is minimized.

It is a further object of this invention to provide such a system in which the digitizer function may be added to an existing display.

It is a further object of this invention to provide such a system having a relatively simple and inexpensive digitizer function.

It is a further object of this invention to provide such a system which allows digitizer data rates which are sufficient to measure handwritten graphical input.

It is a further object of this invention to provide such a system in which an untethered digitizer stylus may be employed.

It is a further object of this invention to provide such a system in which the display output quality is not affected by the digitization signals.

It is a further object of this invention to provide such a system in which digitizer signals may be transmitted from a stylus and received by display electrodes.

It is a further object of this invention to provide such a system in which edge effect accuracy problems are decreased for the stylus-transmitting embodiment.

This invention results from the realization that a truly effective digitization system may be accomplished with an existing display having display electrodes by superimposing positioning signals on the display electrodes and sensing those signals with a stylus, or transmitting from the stylus and sensing their effect on the display electrode drive signals, to accomplish an inherently aligned retrofittable digitization system that has no effect on the optical qualities of the display itself.

This invention features a system for sensing the position of a stylus proximate a display device employing a matrix of display electrodes. The system includes means for generating stylus-positioning signals from either the stylus or the display electrodes, or alternating between the two, and means for sensing an effect of those signals from the other of the stylus and display electrodes in response to the sensed effect. There are means for resolving the position of the stylus in relation to the display electrodes. The positioning signals may be coupled to the display electrodes directly, capacitively or magnetically. The position of the stylus may be resolved by determining the relative strengths of the sensed signals, or the relative phase of the sensed signals. The sensing may be accomplished by detecting electrostatically or electromagnetically the positioning signals.

The positioning signals may be sequentially coupled to different display electrodes, and in that case the stylus position may be resolved based on timing of the sequential coupling. Preferably, the positioning signals are AC signals that may be superimposed on the display matrix drive signals without interrupting the display and without the need for multiplexing the display drive signals. As a result, the invention has no effect on the display quality. The signals may be superimposed with amplifiers for driving positioning currents in the display electrodes. An AC electromagnetic signal may be selectively generated in the stylus and the system may further include means for selectively sensing the signals induced by the electromagnetic signal and selected display electrodes. In that case, the means for resolving may be selectively responsive to the means for sensing the induced signals for determining the stylus position from the induced signals.

In one embodiment, the stylus has no electrical connection to the display device. The signals may be coupled from the stylus to the display electrodes through capacitive or magnetic transference. Further, the position signals may be sensed from the display electrodes through capacitive or magnetic coupling. This may be accomplished with a transformer winding proximate one or more display electrodes. The display device may be an LCD.

DISCLOSURE OF PREFERRED EMBODIMENTS

Other objects, features and advantages will occur to those skilled in the art from the following description of a preferred embodiment and the accompanying drawings, in which.

This invention includes a means of using the electrodes of a display device as part of a position sensing circuit. The position sensing signals are mixed with the display refresh signals on the display electrodes; i.e. the electrical positioning signals are superimposed on the display signals in such a way that they do not interfere with the display function.

Figure 1:
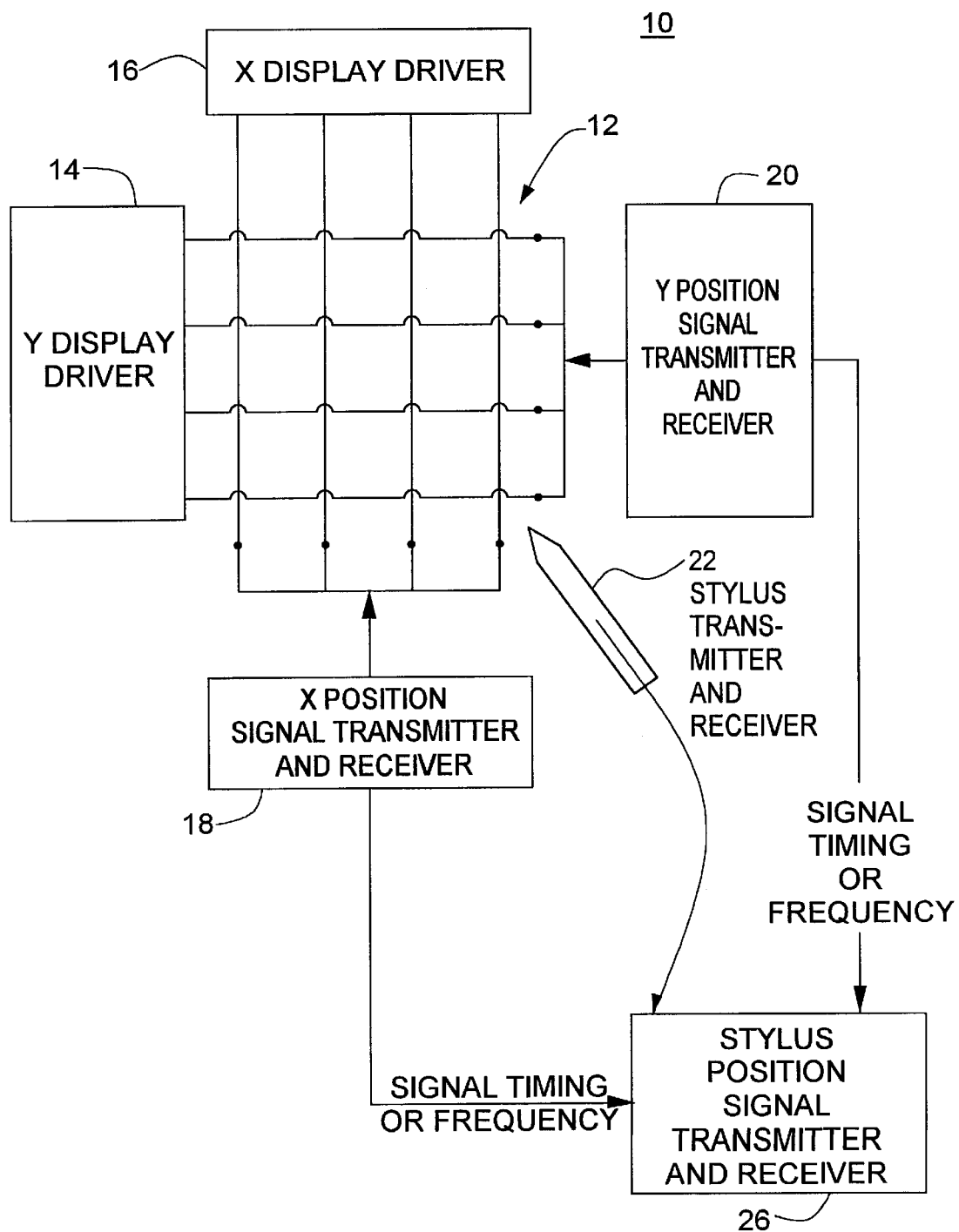
FIG. 1 is a block diagram of a display-integrated stylus detection system according to this invention.

There is shown in FIG. 1 display-integrated stylus detection system 10 according to this invention. System 10 is integrated with matrix display 12 comprising X and Y matrixes of crossed wires connected to X display driver 16 and Y display driver 14, for example a commonly-known LCD device. The system of this invention is integrated into the LCD display device using X position signal driver 18 and Y position signal driver 20 in conjunction with stylus 22 and position sensing driver circuit 26. X position signal transmitter and receiver 18 superimposes digitization signals on the portion of the matrix driven by X display driver 16 as is described below. Similarly, Y position signal driver 20 superimposes digitization signals on the display drive signals generated by Y display driver 14. Stylus 22 then senses these digitization signals and reports the sensing to circuit 26 which, in conjunction with timing or frequency signals from drivers 18 and 20, determines the position of stylus 22 in relation to display matrix 12.

In an alterative operating mode, the digitization signals may be transmitted from stylus 22 and received by position signal receivers in the place of 18 and 20. Another alternative operating mode is to include both transmission and reception functions in circuits 18 and 20 and stylus 22 so that the transmission and reception can be alternated as desired between the display device and the stylus.

Figure 2:
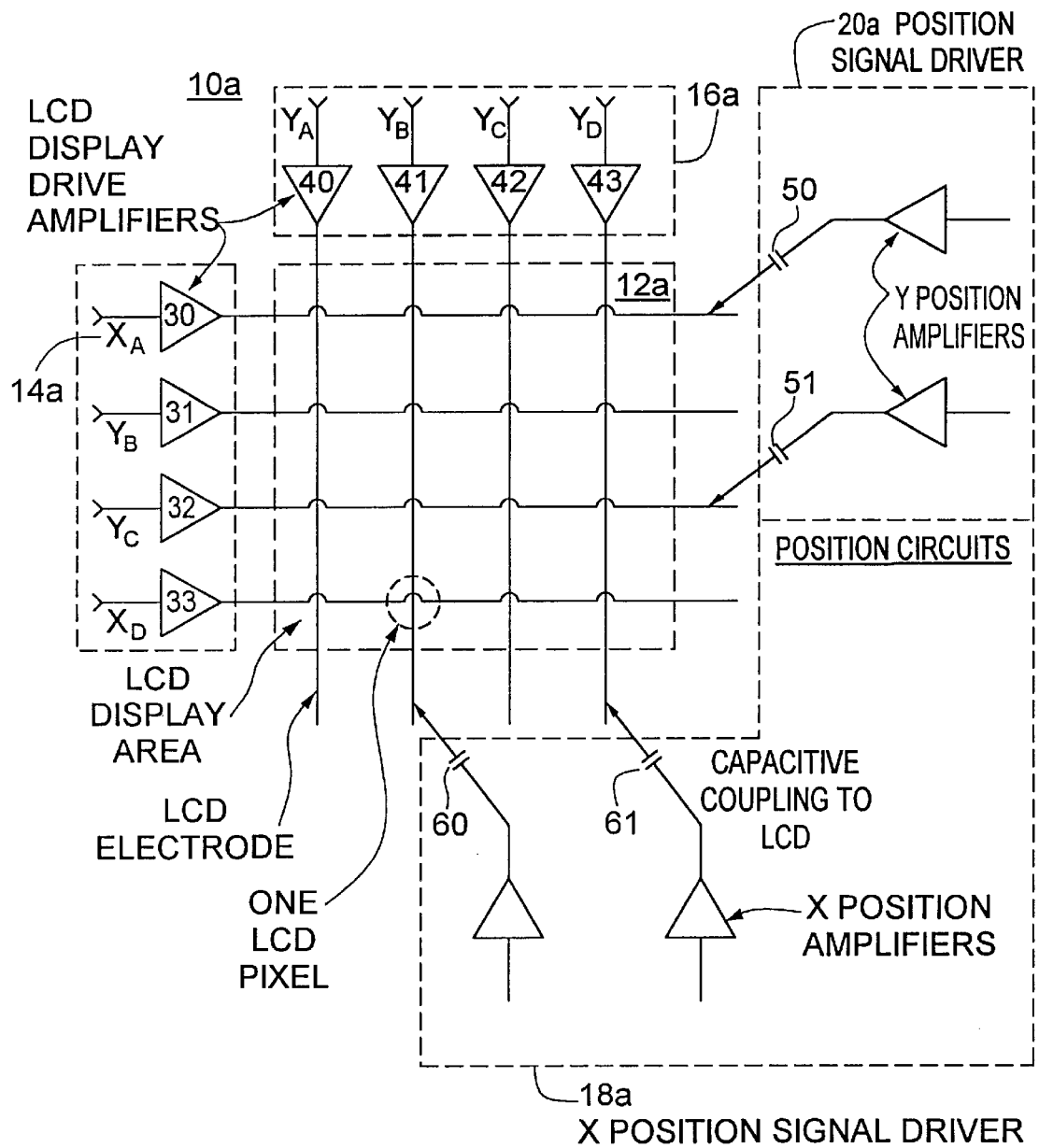
FIG. 2 is a more detailed schematic diagram of one way of implementing the system of FIG. 1 in which the display matrix can be used to either send or receive digitization signals.
Figure 3:
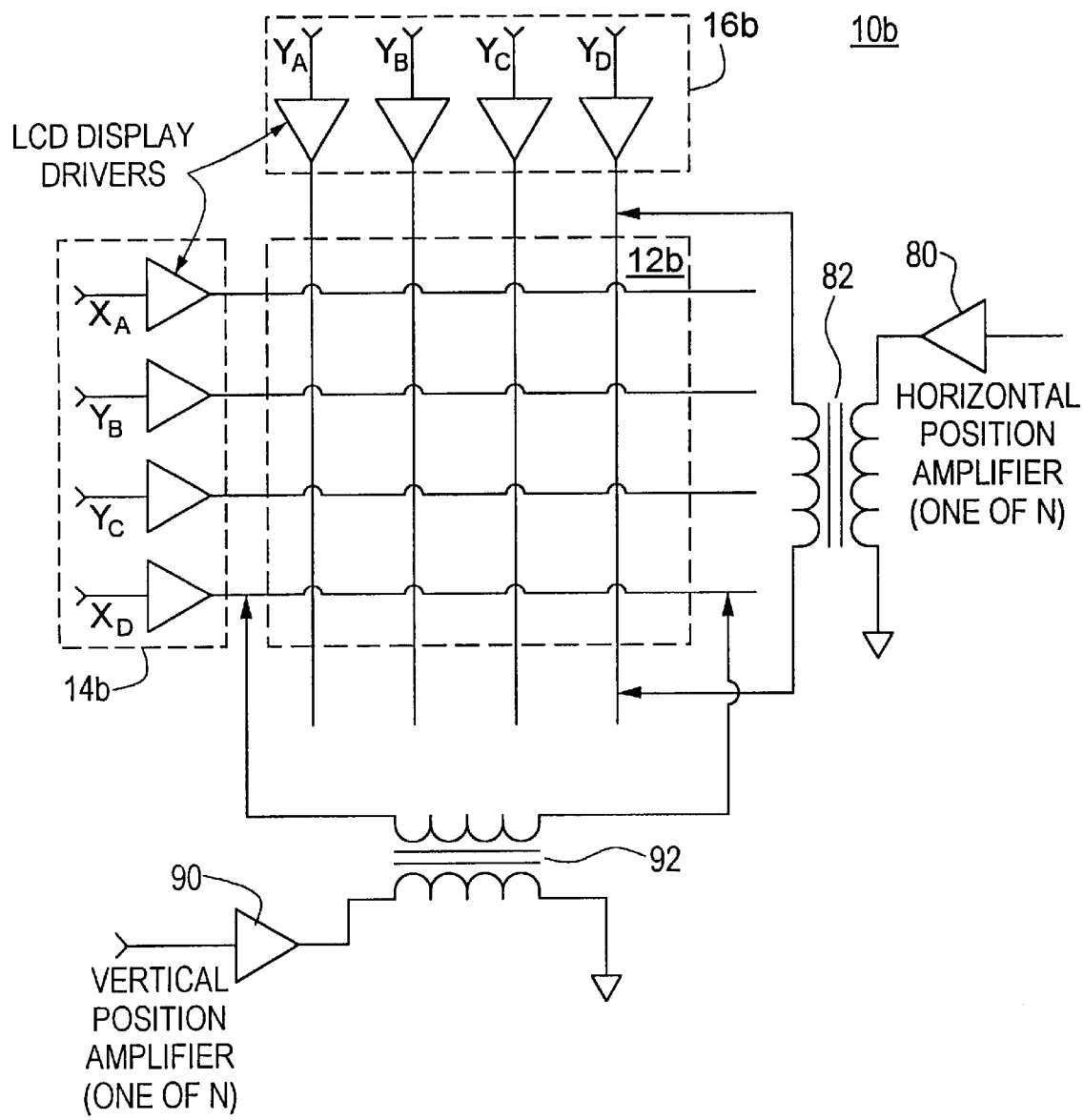
FIG. 3 is a schematic diagram of another implementation of the system of FIG. 1 in which the display matrix can also be used for either sending or receiving the digitization signals.
Figure 4:
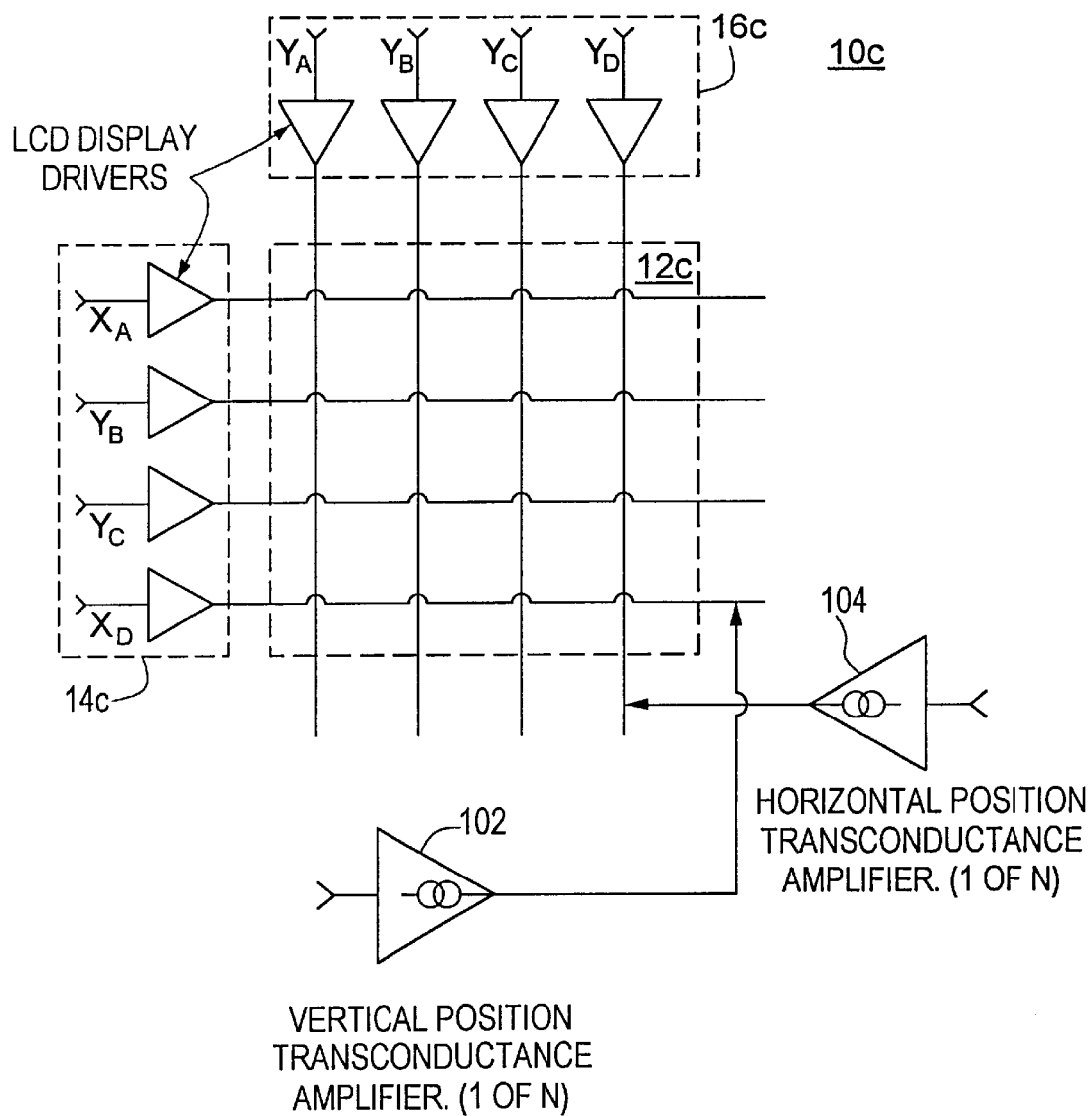
FIG. 4 is a schematic diagram of yet another manner of implementing the system of FIG. 1.

FIGS. 2, 3 and 4 show four electrodes of a liquid crystal display (LCD) 12a, 12b and 12c, respectively, in the X (horizontal) direction, and 4 electrodes in the Y direction.

System 10a, FIG. 2, operates with Y position signal driver 20a and X position signal driver 18a which use amplifiers that are capacitively coupled to every other electrode of electrode matrix 12a; this connection scheme is schematically depicted by virtual capacitors 50, 51, and 60, 61, respectively. The LCD display drive amplifiers 30 through 33 and 40 through 43 already present in the display device act as the terminators or current sinks for the position signals. System 10a may also be used in an embodiment in which a position signal is transmitted from a stylus proximate the display surface and the display electrodes are used to receive the signal, in which case the X and Y position amplifiers in circuits 18a and 20a, respectively, are used for receiving rather than transmitting signals.

FIGS. 3, 4, 5A and 5B disclose different means of conveying current through the electrodes of the display. In the transformer coupled embodiment 10b of FIG. 3, transformers 82 and 92 are used to pass current between a position amplifier and a display electrode. In practice there would be one amplifier and transformer for each display electrode used for sensing. This approach is preferred where the display drivers have insufficient current drive to support the position sense current. This type of differential signal driver approach can also be achieved with methods other than a transformer signal source. For example, differential transconductance amplifiers 102 and 104, FIG. 4, may be used in place of transformer windings 92 and 82, FIG. 3. As with the embodiment of FIG. 2, the embodiment of FIG. 3 may be used in a system in which the stylus sends the signal which is coupled to the matrix conductors and then sensed through the transformer windings.

Figure 5A:
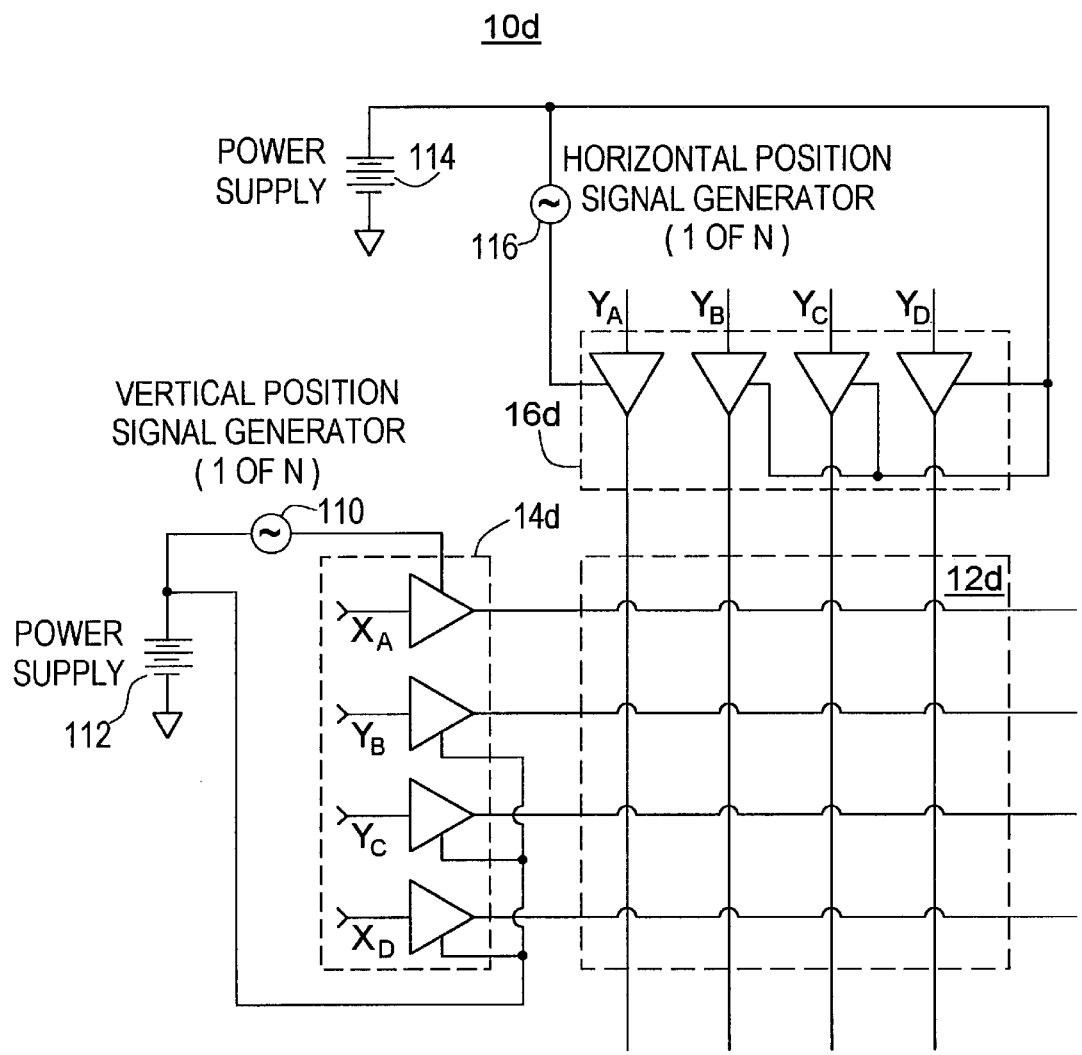
FIG. 5A is a schematic diagram of yet another means of implementing the system of FIG. 1 in which the display matrix is used to transmit the digitization signal.

The embodiment of FIG. 4 uses transconductance amplifiers such as amplifiers 102 and 104 in place of the transformer windings of FIG. 3. This embodiment can also be used for stylus-sensing embodiments. Yet another alternative for transmitting position signals from the matrix is shown in FIG. 5A, in which signal generators 110 and 116 in conjunction with power supplies 112 and 114, respectively, are used to generate the AC signal which is superimposed on the matrix drive signal at drive amplifiers 14d and 16d. For a stylus-transmitting embodiment of this type of circuit, FIG. 5B, signal measuring amplifiers 124 and 134 are used in conjunction with resistors 122 and 132 to measure the received signal which is superimposed on the drive signal wave forms as a result of coupling from the stylus which transmits stylus position signals generated in conjunction with stylus position signal transmission circuit 26a to the matrix conductors. As before, the circuit for only one display matrix is shown. In practice, there would be one such transmit and/or receive circuit for each matrix electrode employed in stylus position sensing.

The following relates to the embodiments of each of FIGS. 2, 3, 4 and 5A, unless otherwise noted.

Each electrode of the display is driven by a display driver which imposes a multi-level voltage signal with a certain waveshape as required to activate pixels at the electrode intersections. This is known in the art of such matrix displays. Display drivers are generally voltage output devices which have low output impedance when they are driving the display.

The X/Y Position circuits of this invention may be added to the display circuit as follows:

1. AC Positioning signals are connected to certain display electrodes by either capacitive or magnetic coupling or by direct connection.

2. These Positioning signals are of high enough frequency and small enough magnitude that they do not interfere with the voltages which drive the display.

3. The AC positioning signals induce currents which flow through the display electrodes, (across the visible portion of the display) and into the Display driver outputs (as in FIG. 2), or back into the position circuit (as in FIGS. 3 and 4).

4. The magnetic fields produced by the AC positioning signals are detected by a detecting circuit. Currents are induced sequentially in the electrodes (or they use different frequencies or waveforms), so the signal received by the detecting circuit from each electrode is differentiable from the others. Also, it is possible to interpolate between the signals from adjacent current carrying electrodes, to achieve resolution finer than the distance between current carrying electrodes. It is also possible to transmit from the stylus and receive at the electrodes, or to alternately transmit from, then receive to the electrodes.

5. A typical LCD display has electrodes on about 0.015" centers. It is not necessary to drive all display electrodes for position sensing. Typical electromagnetic digitizers require drive electrodes at 0.2" distance or more.

6. Coupling of position signals into the display electrodes may be done by making direct electrical contact with the electrodes, or capacitive coupling may be made by placing the positioning signals in close proximity with the appropriate display electrodes. In a similar manner, magnetic coupling of the positioning signals may be used to convey the signals to the display electrodes.

7. These methods may be applied to many types of displays, including passive or active LCD's, and to matrix displays other than LCD's, (for example, to plasma or electroluminescent displays).

8. These methods may be used to integrate position sensing into a display at the time of manufacture, or to retrofit the position sense circuits after manufacture of the display.

The preferred embodiments described above do not require specific position signal connections to the display driver amplifiers. It may be preferable in some cases to use the display driver circuits to transmit both the display signals and the superimposed position signals to the display electrodes. This may be done by one of three methods. First, the display driver circuit can be modified to internally mix the display and position signals. Alternatively, an additional mixing circuit can be added to the output of the display driver. Finally, the display driver signal can be modulated by external means. FIG. 5A shows a circuit configuration 10d where the power supply input to standard LCD display drivers is modulated with position signals. Superimposing position signals onto the driver power supply will cause the driver to mix the display and position data so its output is a combination of both signals.

The following are applicable to any of these three methods of implementing driver-mixed positioning signals.

1. AC Positioning signals are connected to certain display electrodes through the display driver outputs.

2. The Positioning signals are of high enough frequency and small enough magnitude that they do not interfere with the voltages which drive the display.

3. The AC positioning signals induce modulated voltages on the display electrodes. These modulation signals may be detected either electrostatically or electromagnetically by a detector circuit on or above the display surface. This position information is then used to determine the position of said detector circuit.

4. In the case of electrostatic detection, the electric fields produced by the AC positioning signals are detected by a detector circuit. Voltages are induced sequentially in the electrodes (or they use different frequencies), so the signals received by the detector circuit from each electrode is differentiable from the others. Also, it is possible to interpolate between the signals from adjacent current carrying electrodes, to achieve fine resolution. It is also possible to transmit from the stylus and receive at the electrodes, or to alternately transmit from, then receive to the electrodes.

5. A typical LCD display has electrodes on about 0.015" centers. It is not necessary to drive all of these electrodes for position sensing.

6. Electromagnetic coupling of position signals will require current flowing through the display electrodes. For this, a terminator circuit is required at the end of each electrode opposite from the driver amplifier. Terminator circuits may be connected by making direct electrical contact with the display, or capacitive coupling may be made by placing the terminator circuits in close proximity with the appropriate display electrodes. In a similar manner, magnetic coupling may be used to connect the terminator circuits to the display electrodes.

7. These methods may be applied to passive or active LCD's, and to matrix displays other than LCD's, (for example, to plasma or electroluminescent displays).

An alternative embodiment would be to transmit position signals from the stylus.

Figure 6:
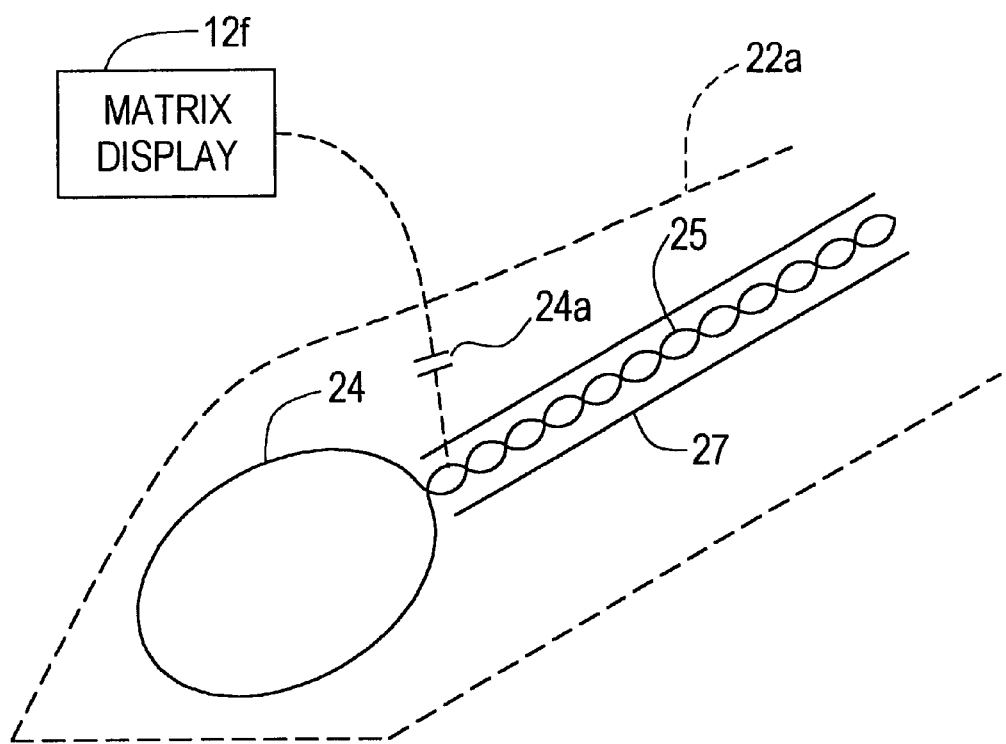
FIG. 6 is a schematic diagram of a signal-receiving or generating stylus tip for use in the system of this invention.

These signals are coupled to the display electrodes, overlaid on the display signals, and then are detected as follows:

Refer to FIGS. 2, 3 and 5A; each of the figures show four electrodes of a liquid crystal display (LCD) in the X (horizontal) direction, and 4 electrodes in the Y direction. A position signal is transmitted from a stylus which is proximate to the display surface. An embodiment of such a stylus 22a is shown in FIG. 6. Stylus 22a includes wire loop 24 positioned in the stylus tip to transmit or pick up signals for an electromagnetic sensing system. Twisted wire pair 25 passes through shield 27 as is known in the art.

Circuit 10b of FIG. 3 differs from circuit 10a of FIG. 2 in its method of detecting position current from the electrodes of the display; circuit 10a picks up the position signal from a position amplifier which is capacitively coupled to certain of the display electrodes. Circuit 10b, FIG. 3, detects current induced into the display electrodes from the stylus by use of a transformer winding connected to the display electrode. This approach is preferred where the display drivers have insufficient current drive to support the position sense currents. This differential signal detector approach can also be achieved with methods other than a transformer signal source. For example, a differential amplifier with high common mode impedance and low differential impedance may be used in place of the transformer windings.

Figure 5B:
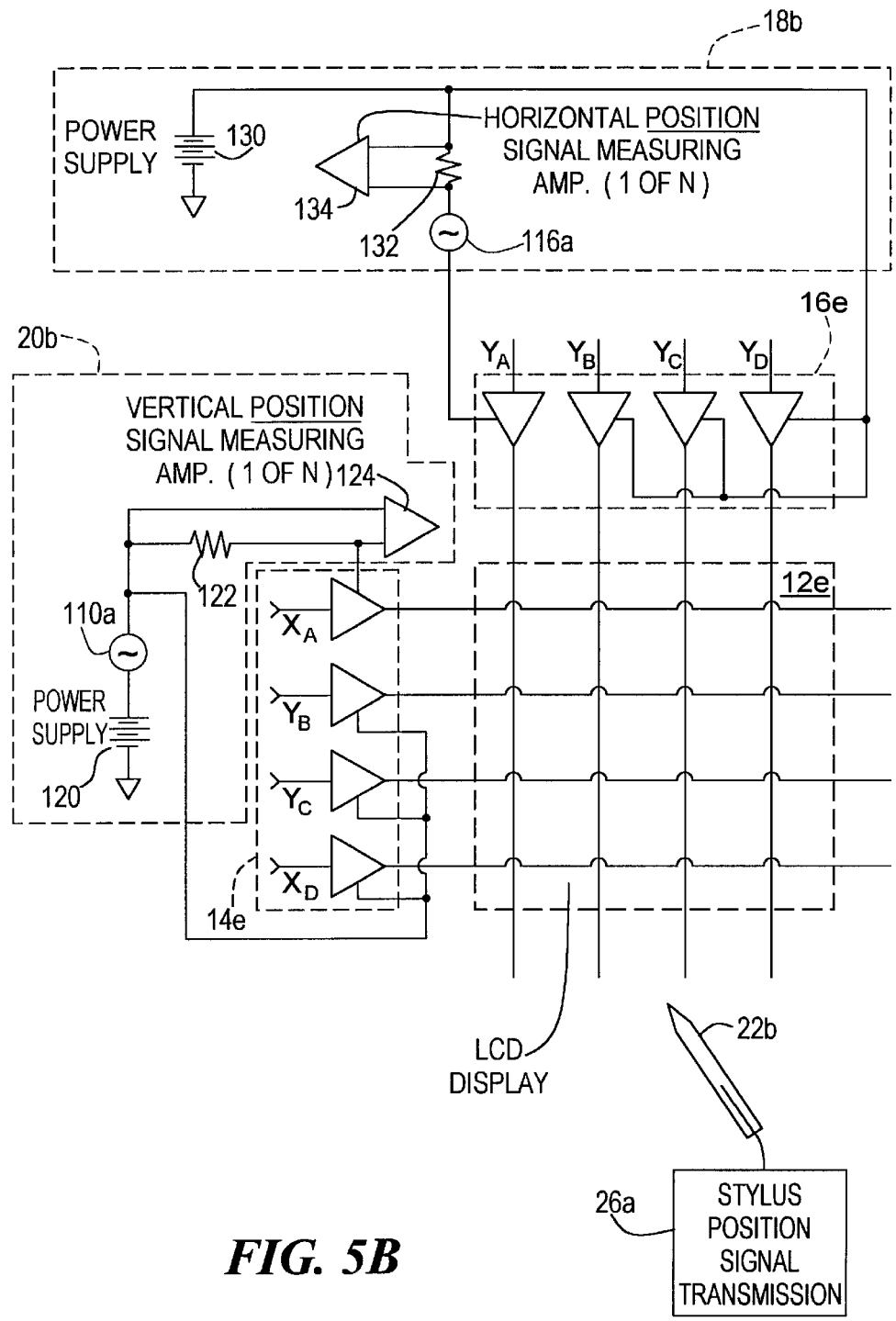
FIG. 5B is aschematic diagram of a system similar to that of FIG. 5A, but which uses the display electrode matrix for digitization signal reception.

All comments below refer to the embodiments of FIGS. 2, 3, and 5B for matrix receiving embodiments, unless otherwise noted.

Each electrode is driven by a display driver which imposes a multi-level voltage signal with certain waveshape as required to activate pixels at the electrode intersections. Display drivers are generally voltage output devices which have low output impedance when they are driving the display.

X/Y Position circuits are added to the display circuits as follows:

1. AC Position signal detector circuits are connected to certain display electrodes by either capacitive or magnetic coupling or by direct connection.

2. Positioning signals are transmitted from a stylus proximate to the display surface. These signals are of high enough frequency and small enough magnitude that they do not interfere with the voltages which drive the display.

3. The AC positioning signals coupled from the stylus induce currents which flow through the display electrodes, (across the visible portion of the display) and into the Display driver outputs (as in FIGS. 2 and 5B), or back into the position circuit (as in FIG. 3).

4. The currents produced by the AC positioning signals are detected by a detecting circuit. Induced currents have different phase and magnitude in different electrodes such that the stylus position relative to them may be determined. Also, it is possible to interpolate between the signals from adjacent current carrying electrodes, to achieve resolution finer than the distance between current carrying electrodes.

5. A typical LCD display has electrodes on about 0.015" centers. It is not necessary to receive from all display electrodes for position sensing. Typical electromagnetic digitizers require drive electrodes at 0.2" distance or more.

6. Coupling of position signal detector circuits to the display electrodes may be done by malting direct electrical contact with the electrodes, or capacitive coupling may be made by placing the positioning signal detector circuit in close proximity with the appropriate display electrodes. In a similar manner, magnetic coupling of the positioning signals may be used to convey the signals to the detector circuits.

7. These methods may be applied to many types of display, including passive or active LCD's, and to matrix displays other than LCD's, (for example, to plasma or electroluminescent displays).

8. These methods may be used to integrate position sensing into a display at the time of manufacture, or to retrofit the position sense circuits after manufacture of the display.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A system for sensing the position of a stylus proximate a display device employing a matrix of display electrodes which generate display electrode signals, wherein the position sensing and display functions are performed simultaneously, comprising:

means for generating in the stylus positioning signals;

means for coupling said positioning signals to the display electrodes and for superimposing said positioning signals onto the display electrode signals;

means for sensing said positioning signals from the display electrodes; and means, responsive to said means for sensing, for resolving the position of the stylus in relation to the display electrodes.

2. The stylus position-sensing system of claim 1 in which said means for coupling from stylus to display electrodes includes means for magnetically transferring said positioning signals to the selected display electrodes.

3. The stylus position-sensing system of claim 2 in which said stylus has no electrical connection to the display device.

4. The stylus position-sensing system of claim 1 in which the display device is an LCD.

* * * * *